(12) United States Patent
Mimura et al.

(10) Patent No.: US 8,511,839 B2
(45) Date of Patent: Aug. 20, 2013

(54) RETROREFLECTIVE ARTICLE

(75) Inventors: Ikuo Mimura, Uozu (JP); Keiji Amemiya, Namerikawa (JP); Chihiro Hayashi, Toyama (JP)

(73) Assignee: Nippon Carbide Industries Co., Inc., Tokyo (JP)

( * ) Notice: Subject to any disclaimer, the term of this patent is extended or adjusted under 35 U.S.C. 154(b) by 91 days.

(21) Appl. No.: 13/132,151

(22) PCT Filed: Dec. 8, 2009

(86) PCT No.: PCT/JP2009/006693
§ 371 (c)(1),
(2), (4) Date: Aug. 5, 2011

(87) PCT Pub. No.: WO2010/067583
PCT Pub. Date: Jun. 17, 2010

(65) Prior Publication Data
US 2011/0286097 A1 Nov. 24, 2011

(30) Foreign Application Priority Data

Dec. 8, 2008 (JP) .................................. 2008-311893

(51) Int. Cl.
*G02B 5/122* (2006.01)
(52) U.S. Cl.
USPC ........................................................ 359/529
(58) Field of Classification Search
USPC .......................................... 359/530, 531, 529
See application file for complete search history.

(56) References Cited

U.S. PATENT DOCUMENTS

| | | | |
|---|---|---|---|
| 1,591,572 A | 7/1926 | Stimson | |
| 3,417,959 A | 12/1968 | Schultz | |
| 3,458,245 A | 7/1969 | Stanley | |
| 3,922,065 A | 11/1975 | Schultz | |
| 3,923,378 A * | 12/1975 | Heenan | 359/530 |
| 3,924,929 A | 12/1975 | Holmen et al. | |
| 4,066,331 A | 1/1978 | Lindner | |
| 4,073,568 A | 2/1978 | Heasley | |
| 4,189,209 A | 2/1980 | Heasley | |
| 5,138,488 A | 8/1992 | Szczech | |
| 6,010,609 A | 1/2000 | Mimura et al. | |

(Continued)

FOREIGN PATENT DOCUMENTS

| | | |
|---|---|---|
| CN | 1756971 | 4/2006 |
| JP | 63-109233 | 7/1988 |
| JP | 10-123309 | 5/1998 |

*Primary Examiner* — Euncha Cherry
(74) *Attorney, Agent, or Firm* — Fitzpatrick, Cella, Harper & Scinto

(57) ABSTRACT

A retroreflective article having excellent retroreflective efficiency, entrance angle characteristic, observation angle characteristic, and rotation angle characteristic is provided. In a retroreflective article including a number of cube corner retroreflective elements formed in a closely packed manner on a common plane (plane Sc), each of the cube corner retroreflective elements having three reflective lateral surfaces (surface a, surface b and surface c) that have three edge lines (HD, HE and HF) and one apex (H) in common and an optical axis that passes through the apex (H) and is at equal distance from the three reflective lateral surfaces (surface a, surface b and surface c), the retroreflective article includes at least two or more types of cube corner retroreflective elements having optical axes tilted with respect to each other within a plane (plane Sv) that is perpendicular to a reflective lateral surface (surface c) and includes a common edge line (HF) of the other reflective lateral surfaces (surface a and surface b) and a perpendicular line from the apex (H) to the common plane (plane Sc).

20 Claims, 10 Drawing Sheets

(56) References Cited

U.S. PATENT DOCUMENTS

| | | |
|---|---|---|
| 6,114,009 A | 9/2000 | Smith |
| 6,120,280 A | 9/2000 | Mimura et al. |
| 6,318,866 B1 | 11/2001 | Mimura et al. |
| 7,152,983 B2 | 12/2006 | Smith |
| 2004/0174603 A1 | 9/2004 | Smith |

* cited by examiner

RETROREFLECTIVE ARTICLE

TECHNICAL FIELD

The invention relates to a retroreflective article, and particularly relates to a retroreflective article including cube corner retroreflective elements that can be preferably used for a traffic sign, a construction sign, retroreflective clothing, a reflector for an optical sensor, a commercial sign, a vehicle registration plate, a vehicle marking and the like.

More particularly, the invention relates to a retroreflective article using cube corner retroreflective elements having improved retroreflective efficiency, entrance angle characteristic, observation angle characteristic and rotation angle characteristic.

BACKGROUND ART

Some proposals have conventionally been made on retroreflective articles including cube corner retroreflective elements having excellent retroreflective efficiency and entrance angle characteristic.

For example, U.S. Pat. No. 1,591,572 (Patent Document 1) by Stimson discloses hexagonal cube corner retroreflective elements. However, there is no description as to what shape of elements is advantageous for obtaining excellent entrance angle characteristic, observation angle characteristic and rotation angle characteristic.

U.S. Pat. No. 3,417,959 (Patent Document 2) and U.S. Pat. No. 3,922,065 (Patent Document 4) by Schultz disclose a method (pin bundling method) of forming a prism at a tip of a metal pin and bundling a number of such pins to form a prism assembly. This method for forming a prism assembly is suitable for producing relatively large prisms, but is not practical when it is necessary to form 2,000/cm$^2$ or more microprisms, for example.

In addition, U.S. Pat. No. 3,458,245 (Patent Document 3) by Stanley discloses retroreflective prisms in which at least two surfaces, or preferably four or more surfaces are arranged alternately forming an obtuse angle and an acute angle.

Furthermore, U.S. Pat. No. 3,924,929 (Patent Document 5) by Holmen et al. also discloses a retroreflective article formed of a repeated pattern of units in which hexagonal prisms are hermetically sealed.

U.S. Pat. No. 4,066,331 (Patent Document 6) by Lindner also discloses a retroreflective article in which hexagonal prisms that are different for each row are arranged.

U.S. Pat. No. 4,073,568 (Patent Document 7) by Heasley also discloses a retroreflective article in which one type of hexagonal prisms are arranged in a repeated pattern.

Similarly, U.S. Pat. No. 4,189,209 (Patent Document 8) by Heasley also discloses a retroreflective article in which two types of hexagonal prisms having different thickness are arranged in a repeated pattern.

Furthermore, U.S. Pat. No. 6,114,009 (Patent Document 9) by Smith discloses a mold suitable for forming cube corner retroreflective sheeting, a method for producing the mold and retroreflective sheeting formed using the mold, and particularly discloses a mold formed of a plurality of thin laminae and a method for producing the mold.

Furthermore, Japanese Utility Model Application Laid-Open No. S63-109233 (Patent Document 10) by Kato discloses a reflective article including a first reflecting part having reflective performance with respect to light incident at a critical angle or larger from the left and a second reflecting part having reflective performance with respect to light incident at a critical angle or larger from the right.

U.S. Pat. No. 6,120,280 (Patent Document 11) and U.S. Pat. No. 6,010,609 (Patent Document 12) by Mimura et al. disclose a design of hexagonal cube corner retroreflective elements having an asymmetrical shape in which optical axes are tilted leftward and rightward of the elements and a method of making the element.

It is stated therein that according to such hexagonal cube corner retroreflective elements having an asymmetrical shape in which optical axes are tilted leftward and rightward of the elements, an improved entrance angle characteristic is achieved in the tilt direction of the two optical axes. However, in the elements disclosed in these documents, excellent improvement in rotation angle characteristic cannot be achieved.

On the other hand, U.S. Pat. No. 6,318,866 (Patent Document 13) by Mimura et al. discloses various proposals on improvement of observation angles.

This Patent Document 13 discloses that the observation angle characteristic can be improved by making side surfaces that face each other of a pair of triangular pyramidal cube corner retroreflective elements have different shapes.

CITATION LIST

Patent Documents
[Patent Document 1] U.S. Pat. No. 1,591,572
[Patent Document 2] U.S. Pat. No. 3,417,959
[Patent Document 3] U.S. Pat. No. 3,458,245
[Patent Document 4] U.S. Pat. No. 3,922,065
[Patent Document 5] U.S. Pat. No. 3,924,929
[Patent Document 6] U.S. Pat. No. 4,066,331
[Patent Document 7] U.S. Pat. No. 4,073,568
[Patent Document 8] U.S. Pat. No. 4,189,209
[Patent Document 9] U.S. Pat. No. 6,114,009
[Patent Document 10] Japanese Utility Model Application Laid-Open No. S63-109233
[Patent Document 11] U.S. Pat. No. 6,120,280
[Patent Document 12] U.S. Pat. No. 6,010,609
[Patent Document 13] U.S. Pat. No. 6,318,866

SUMMARY OF INVENTION

Objects to be Achieved by the Invention

An object to be achieved by the invention is to enhance visibility of a retroreflective article using cube corner retroreflective elements.

In particular, an object to be achieved by the invention is to provide a retroreflective article using cube corner retroreflective elements that can be preferably used for a traffic sign and having retroreflective efficiency, an entrance angle characteristic, an observation angle characteristic and a rotation angle characteristic.

More specifically, an object is to provide a retroreflective article including cube corner retroreflective elements that can be preferably used for a traffic sign, a construction sign, retroreflective clothing, a reflector for an optical sensor, a vehicle marking or the like.

Means for Achieving the Objects

Conventionally, so-called hexagonal cube corner retroreflective elements having hexagonal projection geometry are well known. The hexagonal cube corner retroreflective elements are known to have significantly higher retroreflective efficiency than triangular pyramidal cube corner retroreflective elements used for commercially available traffic signs in theory. However, such hexagonal cube corner retroreflective elements are difficult to process by die machining with such a very small size that can be applied to a product in a form of sheeting, and there is no example of application to a sheeting product. Rather, the hexagonal retroreflective elements are used for pavement markers and roadside reflectors for which relatively larger elements are used.

In addition, as for the shape of the hexagonal cube corner retroreflective elements that can have excellent entrance angle characteristic, observation angle characteristic and rotation angle characteristic, only conventional techniques as those described above are disclosed, but no technique by which retroreflective elements can be expected to have enough performance to be used for a traffic sign has been disclosed.

A so-called hexagonal cube corner retroreflective element is an element in which three quadrilateral reflective lateral surfaces (surface a, surface b and surface c) have three edge lines (HD, HE and HF) and one apex (H) in common and are defined by six outer circumferential sides (AE, EC, CD, DB, BF and FA), and which has an optical axis passing through the apex (H) and at equal distance from the three reflective lateral surfaces (surface a, surface b and surface c) as shown in FIG. 3 illustrating a conventional technique.

This conventionally known optical element is typically an element in which the three edge lines (HD, HE and HF) have equal length and the optical axis thereof is perpendicular to a common plane (plane Sc) or tilted toward one or two directions.

The common plane (plane Sc) is a plane that serves as a reference for reflection planes of the retroreflective article, and is defined as a plane parallel to a virtual plane connecting the deepest apexes (on the side of incidence plane) of elements having the same shape.

A retroreflective article according to the invention includes at least two or more types of cube corner retroreflective elements having optical axes tilted with respect to each other within a plane (plane Sv) that is perpendicular to a reflective lateral surface (surface c) of each cube corner retroreflective element and includes the common edge line (HF) of the other reflective lateral surfaces (surface a and surface b) and a perpendicular line from the apex (H) to the common plane (plane Sc).

Such cube corner retroreflective elements having optical axes tilted within a plane (plane Sv) that is perpendicular to a reflective lateral surface (surface c) and includes the common edge line (HF) of the other reflective lateral surfaces (surface a and surface b) and a perpendicular line from the apex (H) to the common plane (plane Sc) are not conventionally known. Conventionally known elements having optical axes tilted toward two directions are disclosed in U.S. Pat. No. 6,120,280 (Patent Document 11) disclosed by the inventors of the present invention, in which the tilt directions of the optical axes of such elements are directions toward both the two reflective lateral surfaces (surface a and surface b). With such tilt of optical axes, improvement in the retroreflective performance in the directions of the optical axes is achieved.

However, in the conventionally known hexagonal cube corner retroreflective elements, optical properties in the directions toward the two reflective lateral surfaces (surface a and surface b) are symmetrical in the left and right directions but optical properties in the directions toward the surface c and the edge line HF have asymmetrical shapes and are not equal. Therefore, there has been a problem in the conventionally known hexagonal cube corner retroreflective elements that the retroreflective performance varies depending on the light incidence direction.

Thus, in the conventionally known hexagonal cube, corner retroreflective elements, the tilt directions of the optical axes are opposite to each other, but both the tilt directions of the two optical axes are only in the directions toward the reflective lateral surfaces (surface a and surface b). Therefore, improvement in the entrance angle characteristic as a result of tilting the optical axes has the same improvement effect in the left and right directions. However, in the conventionally known hexagonal cube corner retroreflective elements, such improvement cannot be achieved in the directions toward the surface c and the edge lines HF that are perpendicular to the tilt directions of the optical axes. Therefore, in the conventionally known hexagonal cube corner retroreflective elements, improvement in the retroreflective efficiency cannot be achieved uniformly in all directions.

Note that, in the invention, a tilt component in the direction toward the surface a or the surface b within a plane (plane Sh) that is perpendicular to the plane Sv and includes a line perpendicular to the common plane (plane Sc) among tilt components of the optical axis of a cube corner retroreflective element is defined as a plane-Sh optical axis tilt angle ($\theta h$).

A tilt component within the plane Sv is defined as a plane-Sv optical axis tilt angle ($\theta v$). The tilt angle of the optical axis of a cube corner retroreflective element is defined as an angle ($\theta$) combining the two angle components ($\theta h$ and $\theta v$). The tilt direction of the optical axis can be appropriately changed in any direction over 360° of the cube corner retroreflective element.

Note that the tilt angle $\theta v$ of a negative tilt indicated by, a negative sign (−) means a tilt toward the surface c (upward in the drawings), and the tilt angle $\theta v$ of a positive tilt indicated by a positive sign (+) means a tilt toward the edge line HF (downward in the drawings).

In addition, the tilt angle $\theta h$ of a negative tilt indicated by a negative sign (−) means a tilt toward the surface a, which is leftward in the drawings, and the tilt angle $\theta h$ of a positive tilt indicated by a positive sign (+) is defined as a tilt toward the surface b, which is rightward.

In a cube corner retroreflective element of the retroreflective article according to the invention, the optical axis can be tilted with respect to a perpendicular line from the apex (H) to the common plane (plane Sc) within the plane (plane Sv) that is perpendicular to a reflective lateral surface (surface c) and includes a common edge line (HF) of the other reflective lateral surfaces (surface a and surface b) and the perpendicular line from the apex (H) to the common plane (Plane Sc). Therefore, the aforementioned disadvantages can be eliminated.

Moreover, the cube corner retroreflective elements of the retroreflective article according to the invention includes at least two or more types of cube corner retroreflective elements having optical axes tilted with respect to each other within a plane (plane Sv) that is perpendicular to a reflective lateral surface (surface c) of each cube corner retroreflective element and includes the common edge line (HF) of the other reflective lateral surfaces (surface a and surface b) and a perpendicular line from the apex (H) to the common plane (plane Sc). Therefore, the optical performance can also be improved both in the directions toward the surface c and toward the edge line HF.

As a result, the cube corner retroreflective elements according to the invention can achieve uniform optical characteristic and rotation angle characteristic in any of directions including both the directions toward the surface a and the surface b or both the directions toward the surface c and the edge line HF.

Moreover, the cube corner retroreflective elements according to the invention preferably include at least one or more pairs of cube corner retroreflective elements having optical axes tilted toward opposite directions with respect to a perpendicular line from the apex (H) to the common plane (plane Sc), within a plane (plane Sv) that is perpendicular to a reflective lateral surface (surface c) and includes a common edge line (HF) of the other reflective lateral surfaces (surface a and surface b) and the perpendicular line from the apex (H) to the common plane (plane Sc).

Such retroreflective article including at least one or more pairs of cube corner retroreflective elements tilted toward opposite directions is more preferable in that a uniform optical characteristic or rotation angle characteristic can also be achieved both in the directions toward the surface c and toward the edge line HF.

The angles of the tilts toward opposite directions within the plane Sv are preferably tilt angles that are equal but toward opposite directions. However, the optical axes may be tilted at different angles, which can be appropriately selected depending on purposes of use and installation conditions.

The optical axes of the cube corner retroreflective elements according to the invention are preferably tilted at angles ($\theta v$) in a range of +0.5 to +15° or –0.5 to –15° with respect to the perpendicular lines from the apexes (H) of the elements to the common plane (plane Sc).

If $\theta v$ is in the range of +0.5 to +15° or –0.5 to –15°, the improvement effect produced by tilting the optical axes tends to be large, the difference between the areas of the three reflective lateral surfaces (surface a, surface b and surface c) tends not to be excessively large, and the retroreflective efficiency of retroreflecting incident light by reflecting the incident light by the three reflective lateral surfaces tends not to be degraded.

Furthermore, the optical axes of the cube corner retroreflective elements according to the invention are preferably tilted at angles ($\theta v$) in a range of +2 to +7° or –2 to –7° with respect to the perpendicular lines from the apexes (H) of the elements to the common plane (plane Sc).

Effect of the Invention

According to the invention, it is possible to provide a retroreflective article having an excellent wide angle characteristic, and to provide a retroreflective article using cube corner retroreflective elements having excellent retroreflective efficiency, entrance angle characteristic, observation angle characteristic and rotation angle characteristic.

BEST MODE FOR CARRYING OUT THE INVENTION

Figure 1:
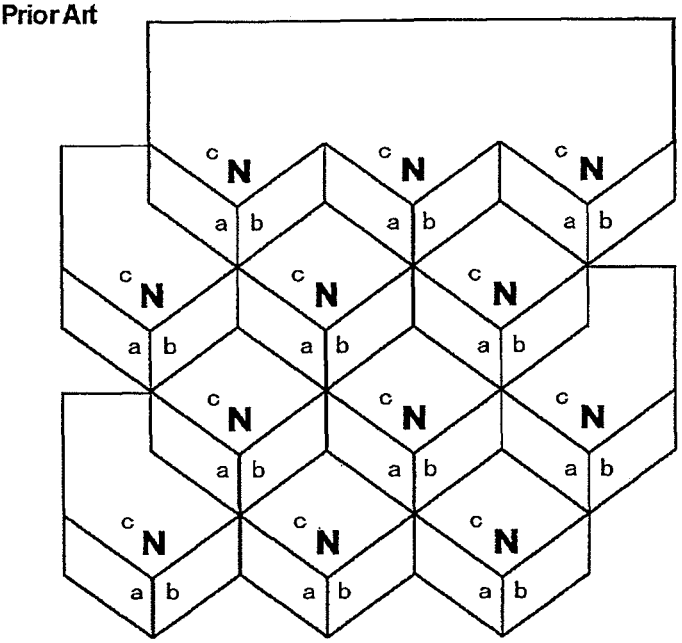
FIG. 1 is a front view of a group of hexagonal cube corner retroreflective elements according to a conventional technique.

Preferred embodiments of a retroreflective article according to the invention will be described below referring to the drawings.

FIG. 1 is a front view of a group of hexagonal cube corner retroreflective elements in a retroreflective article according to a conventional technique. In FIG. 1, a symbol N on a reflective lateral surface of an element indicates that the element is a so-called normal element whose optical axis is perpendicular to a common plane (plane Sc). FIG. 1 shows an assembly where all hexagonal cube corner retroreflective elements are normal elements that have the same symmetrical shape.

Figure 2:
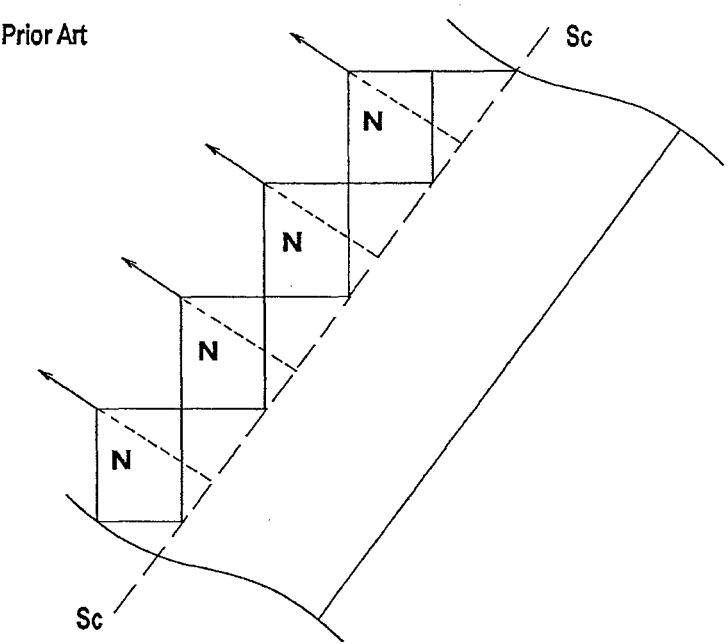
FIG. 2 is a side view of the group of hexagonal cube corner retroreflective elements according to the conventional technique.

FIG. 2 is a side view of the group of normal hexagonal cube corner retroreflective elements in the retroreflective article according to the conventional technique shown in FIG. 1. As shown in FIG. 2, the apexes of the normal hexagonal cube corner retroreflective elements have equal height, and the common plane (plane Sc) is a plane connecting the deepest apexes of the normal hexagonal cube corner retroreflective elements. In FIG. 2, arrows indicate the directions of the optical axes. The directions of the optical axes of the normal hexagonal cube corner retroreflective elements are perpendicular to the common plane (plane Sc).

Figure 3:
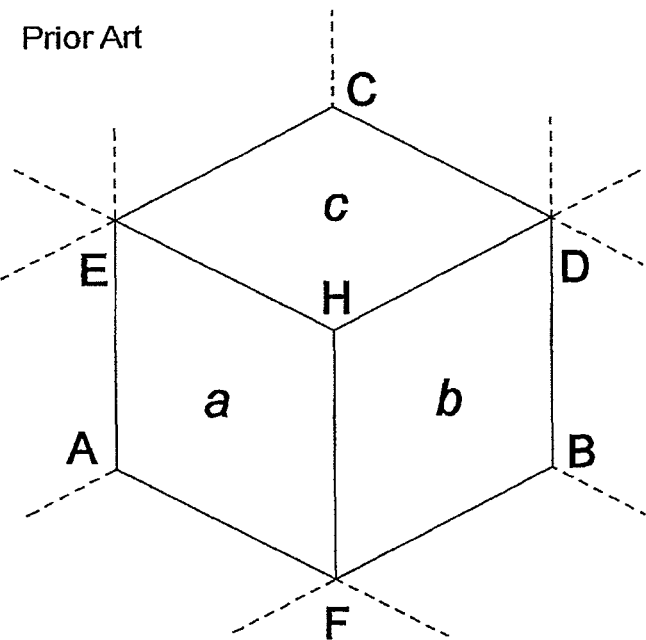
FIG. 3 is a view showing a hexagonal cube corner retroreflective element according to the conventional technique.

FIG. 3 is a view showing one of the normal hexagonal cube corner retroreflective elements shown in FIG. 1. As shown in FIG. 3, three square reflective lateral surfaces (surface a, surface b and surface c) have three edge lines (HD, HE and HF) and one apex (H) in common and are defined by six outer circumferential sides (AE, EC, CD, DB, BF and FA). In such a normal hexagonal cube corner retroreflective element, the optical axis passes through the apex (H) and is at equal distance from the three reflective lateral surfaces (surface a, surface b and surface c) and perpendicular to the common plane (plane Sc).

The normal hexagonal cube corner retroreflective element is formed so that the angles (also called apical angles) between the three reflective lateral surfaces (surface a, surface b and surface c) are perpendicular to one another so as to allow retroreflection. Alternatively, it is common to slightly deviate the angles from perpendicularity so that retroreflected light is divergent within a width of about 1 to 3°, for example, in a case where the positions of a light source and a driver as an observer are different, such as a case of a traffic sign. Improvement in the observation angle characteristic can be achieved by deviating the apical angle in this manner. This technique can also be applied to a retroreflective article having cube corner retroreflective elements formed thereon according to the invention.

Figure 4:
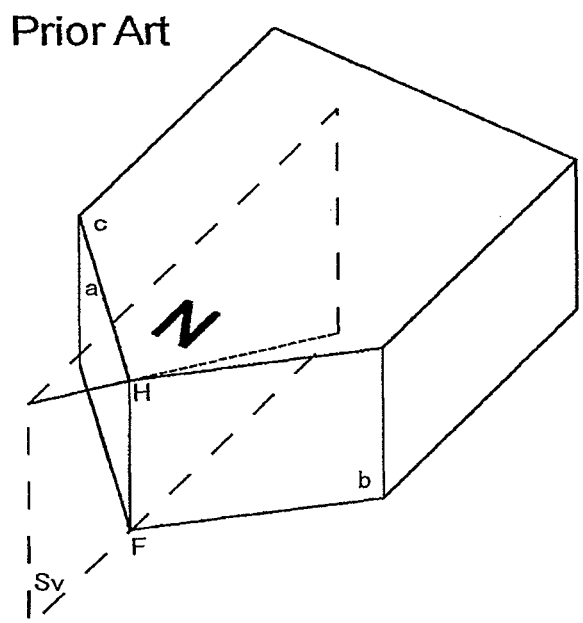
FIG. 4 is a perspective view of the hexagonal cube corner retroreflective element according to the conventional technique.

FIG. 4 is a perspective view of the normal hexagonal cube corner retroreflective element according to the conventional technique shown in FIG. 3. A symbol N on a reflective lateral surface indicates that the element is a normal element. A line segment extending from the apex indicates the direction of the optical axis. In such a normal hexagonal cube corner retroreflective element, the optical axis is coincident with a perpendicular line from the apex (H) to the common plane (plane Sc) within a plane (plane Sv) that is perpendicular to a reflective lateral surface (surface c) and includes the common edge line (HF) of the other reflective lateral surfaces (surface a and surface b) and the perpendicular line from the apex (H) to the common plane (plane Sc) as shown in FIG. 4.

Figure 5:
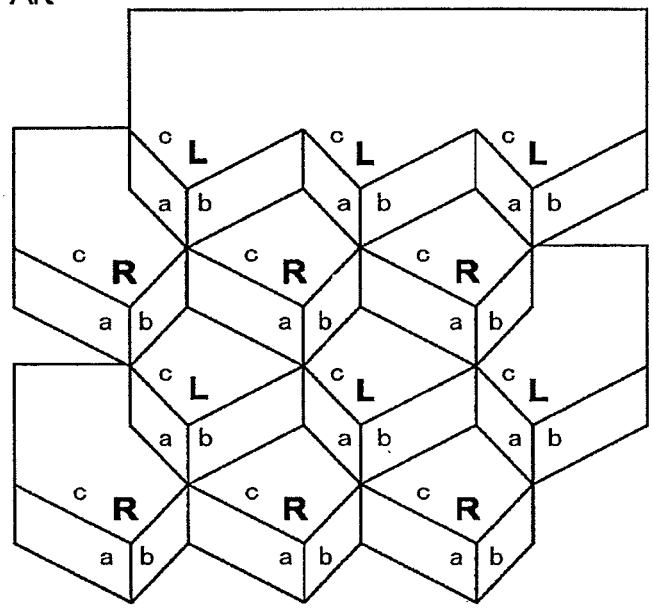
FIG. 5 is a front view of a group of hexagonal cube corner retroreflective elements according to a conventional technique.

FIG. 5 is a view showing a group of hexagonal cube corner retroreflective elements having optical axes tilted in two directions in a retroreflective article according to a conventional technique, and shows a group of elements disclosed in U.S. Pat. No. 6,120,280 (Patent Document 11) disclosed by the inventors of the present invention.

As shown in FIG. 5, a row of retroreflective elements having the same tilt direction and the same tilt angle of θh and a row of retroreflective elements having the same tilt direction opposite to that of the above row and the same tilt angle of θh as that of the above row are arranged alternately. Note that a negative tilt (−) of the θh tilt is defined as a tilt toward the surface a that is leftward in the drawing and a positive tilt (+) is defined as a tilt toward the surface b that is rightward in the drawing. The tilt directions of the optical axes of such elements include both the directions toward the two reflective lateral surfaces (surface a and surface b). A symbol L on a reflective lateral surface indicates that the optical axis is tilted leftward in the drawing, and a symbol R indicates that the optical axis is tilted rightward in the drawing.

Such tilt of optical axes allows the retroreflective performance in the directions of the optical axes to be improved. However, in the retroreflective article shown in FIG. 5, improvement in the retroreflective performance in the upward and downward directions cannot be achieved.

Figure 6:
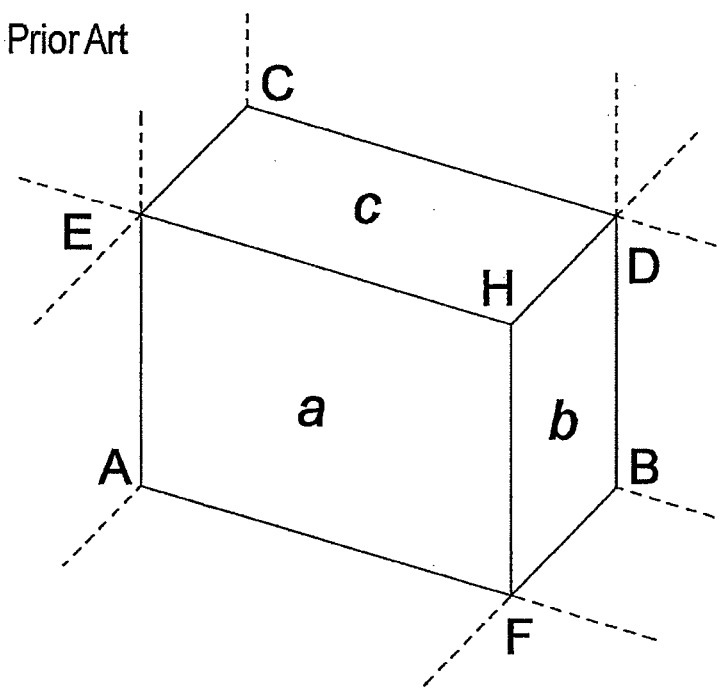
FIG. 6 is a perspective view of a hexagonal cube corner retroreflective element according to the conventional technique.

FIG. 6 is an enlarged view of a hexagonal cube corner retroreflective element whose optical axis is tilted rightward in the retroreflective article according to the conventional technique shown in FIG. 5. In such a hexagonal cube corner retroreflective element, three quadrilateral reflective lateral surfaces (surface a, surface b and surface c) also have three edge lines (HD, HE and HF) and one apex (H) in common and are defined by six outer circumferential sides (AE, EC, CD, DB, BF and FA), and the optical axis passes through the apex (H) at equal distance from the three reflective lateral surfaces (surface a, surface b and surface c), similarly to the normal reflective element as shown in FIG. 3.

However, since the three quadrilateral reflective lateral surfaces (surface a, surface b and surface c) do not have the same shape and are all rectangular, the areas of the three reflective lateral surfaces are not equal to each other. Therefore, a problem that the retroreflective efficiency lowers is likely to arise, and this disadvantage is greater as the tilt angle of the optical axis is larger.

Figure 7:
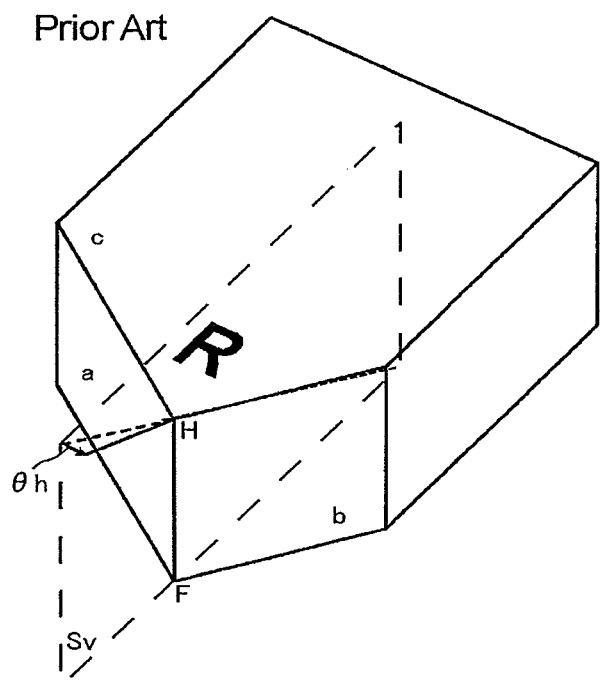
FIG. 7 is a perspective view of a hexagonal cube corner retroreflective element according to the conventional technique.

FIG. 7 is a perspective view of a hexagonal cube corner retroreflective element that is tilted rightward in the group of hexagonal cube corner retroreflective elements according to the conventional technique shown in FIG. 5. A symbol R on a reflective lateral surface indicates that the hexagonal cube corner retroreflective element is a tilted element that is tilted rightward and the optical axis thereof is tilted toward the surface b within a plane Sh. A solid line extending from the apex indicates the direction of the optical axis. The optical axis is shown to be tilted rightward from an optical axis, which is indicated by a broken line, of a normal reflective element that is perpendicular to the plane Sc. In such a hexagonal cube corner retroreflective element, the optical axis is deviated rightward with respect to a plane (plane Sv) that is perpendicular to a reflective lateral surface (surface c) and includes the common edge line (HF) of the other reflective lateral surfaces (surface a and surface b) and a perpendicular line from the apex (H) to the common plane (plane Sc) while a component thereof within the plane Sv is along the same direction as a perpendicular line from the apex (H) to the common plane (plane Sc), as shown in FIG. 7.

Figure 8:
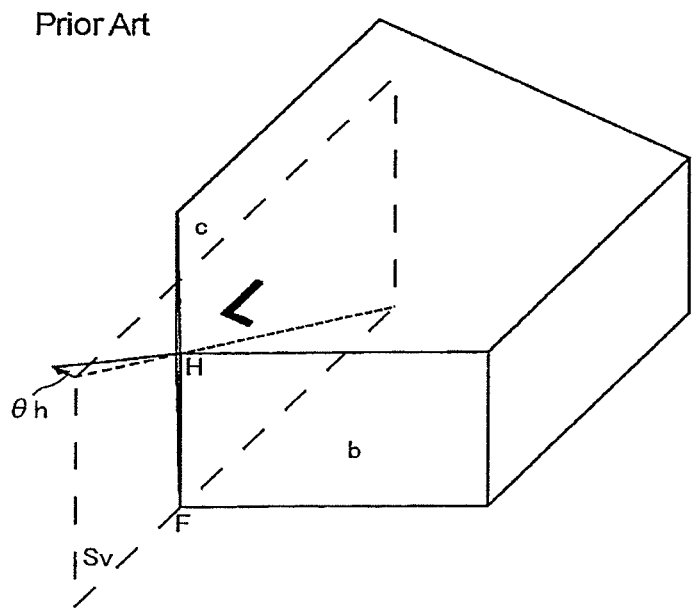
FIG. 8 is a perspective view of a hexagonal cube corner retroreflective element according to a conventional technique.

Similarly, FIG. 8 is a perspective view of a hexagonal cube corner retroreflective element that is tilted leftward in the group of hexagonal cube corner retroreflective elements according to the conventional technique shown in FIG. 5. A symbol L on a reflective lateral surface indicates that the hexagonal cube corner retroreflective element is a tilted element that is tilted leftward and the optical axis thereof is tilted toward the surface a within the plane Sh. A solid line extending from the apex indicates the direction of the optical axis. The optical axis is shown to be tilted leftward from an optical axis, which is indicated by a broken line, of a normal reflective element that is perpendicular to the plane Sc. In such a hexagonal cube corner retroreflective element, the optical axis is deviated leftward with respect to the plane Sv while a component thereof within the plane Sv is along the same direction as a perpendicular line from the apex (H) to the common plane (plane Sc), as shown in FIG. 8.

Figure 9:
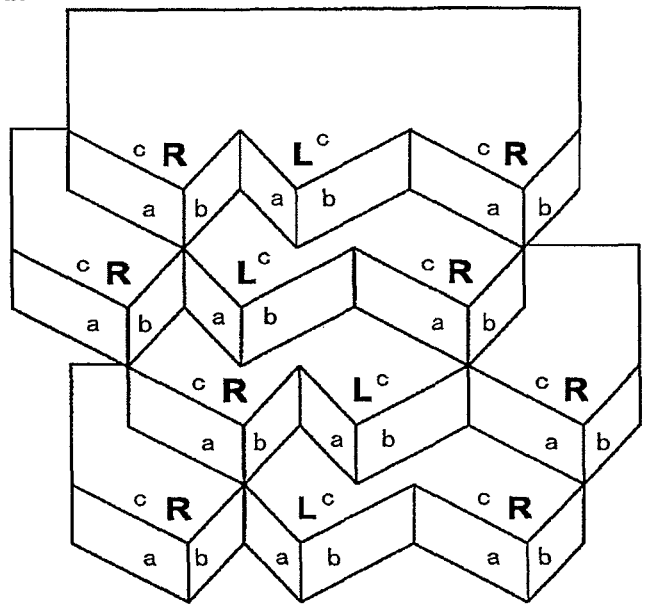
FIG. 9 is a front view of a group of hexagonal cube corner retroreflective elements according to a conventional technique.

FIG. 9 is a view showing a group of hexagonal cube corner retroreflective elements in a conventionally known retroreflective article in which optical axes are tilted leftward and rightward similarly to FIG. 5. However, while the optical axes of the hexagonal cube corner retroreflective elements in one row are tilted in the same direction in the group of elements shown in FIG. 5, hexagonal cube corner retroreflective elements whose optical axes are tilted alternately toward different directions in one row are formed in the group of hexagonal cube corner retroreflective elements shown in FIG. 9.

First Embodiment

Figure 10:
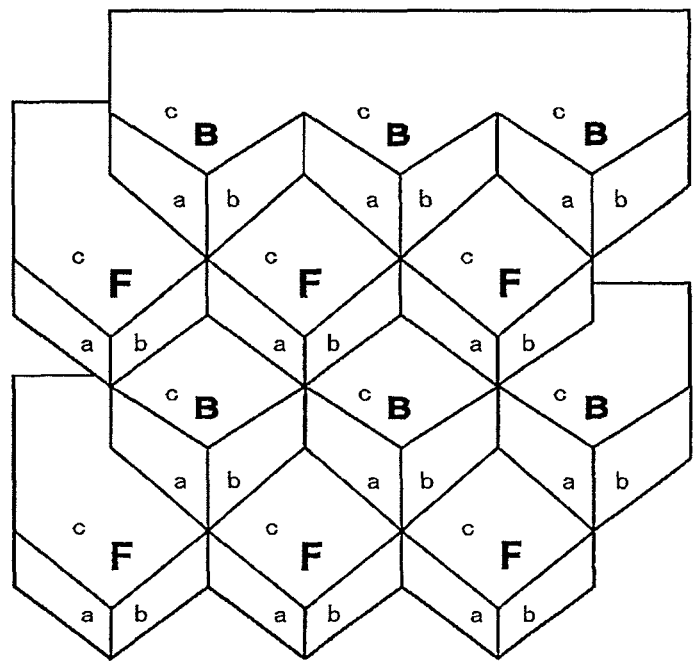
FIG. 10 is a front view of a retroreflective article according to a first embodiment of the invention.

FIG. 10 is a view showing a group of hexagonal cube corner retroreflective elements in a retroreflective article according to a first embodiment of the invention. In a hexagonal cube corner retroreflective element according to this embodiment shown in FIG. 10, the optical axis is tilted with respect to a perpendicular line from the apex (H) to a common plane (plane Sc) within a plane (plane Sv) that is perpendicular to a reflective lateral surface (surface c) and includes the common edge line (HF) of the other reflective lateral surfaces (surface a and surface b) and the perpendicular line from the apex (H) to the common plane (plane Sc). Note that symbols therein correspond to those of the retroreflective element shown in FIG. 3.

Each element in the group of hexagonal cube corner retroreflective elements shown in FIG. 10 is symmetrical to an edge line (HF) between two reflective lateral surfaces (surface a and surface b). In addition, the optical axis thereof is tilted with respect to the perpendicular line from the apex (H) to the common plane (plane Sc) within the plane (plane Sv) that is perpendicular to a reflective lateral surface (surface c) and includes the common edge line (HF) of the other reflective lateral surfaces (surface a and surface b).

In FIG. 10, an element indicated by a symbol B on a reflective lateral surface is an element whose tilt θv toward the surface c within the plane Sv is a negative tilt (−). On the other hand, an element indicated by a symbol F on a reflective lateral surface is an element whose tilt θv toward the edge line (HF) within the plane Sv is a positive tilt (+).

Figure 11:
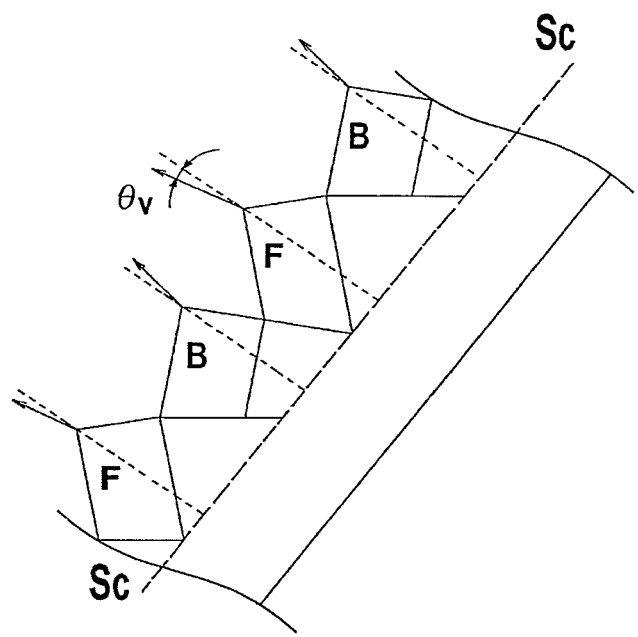
FIG. 11 is a side view of the retroreflective article according to the first embodiment.

FIG. 11 is a side view of the group of elements shown in FIG. 10 in which the tilt θv is toward the positive direction or toward the negative direction in every other row. In FIG. 11, line segments of arrows indicate tilt directions of optical axes of the respective elements, and broken lines indicate tilts (line segments perpendicular to the common plane Sc) of optical axes of normal elements. The tilt directions of the optical axes of the elements are upward (negative direction) or downward (positive direction) with respect to the tilt directions, indicated by the broken lines, of the optical axes of normal elements. In addition, as shown in FIG. 11, the apexes of the hexagonal cube corner retroreflective elements according to this embodiment have different depths, and the common plane (plane Sc) is a plane connecting apexes of the hexagonal cube corner retroreflective elements formed at the deepest positions.

Figure 12:
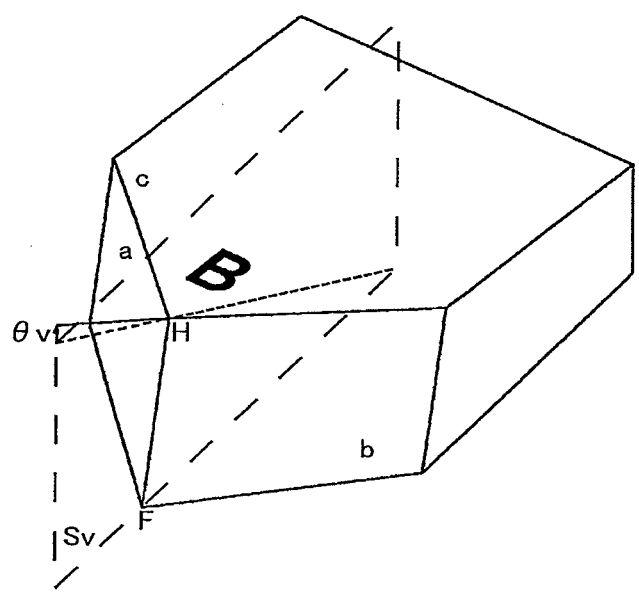
FIG. 12 is a perspective view showing a cube corner retroreflective element in the retroreflective article according to the first embodiment.

FIG. 12 is a perspective view of a retroreflective element having a tilt θv that is a negative tilt in the group of hexagonal cube corner retroreflective elements according to the invention shown in FIG. 10. A symbol B on a reflective lateral surface indicates that the hexagonal cube corner retroreflective element is a tilted element whose optical axis is tilted toward the surface c. A solid line extending from the apex indicates the direction of the optical axis. The optical axis is tilted upward with respect to the tilt direction, which is indicated by a broken line, of a normal reflective element (line segment perpendicular to the common plane Sc). Since the hexagonal cube corner retroreflective element has a symmetrical shape, the optical axis thereof is within a plane (plane Sv) that is perpendicular to a reflective lateral surface (surface c) and includes the common edge line (HF) of the other reflective lateral surfaces (surface a and surface b) and the perpendicular line from the apex (H) to the common plane (plane Sc).

Figure 13:
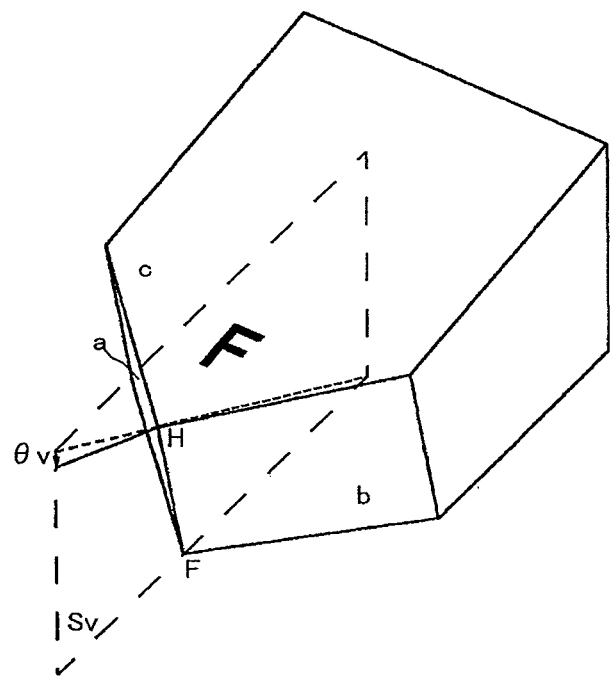
FIG. 13 is a perspective view showing a cube corner retroreflective element in the retroreflective article according to the first embodiment.

FIG. 13 is a perspective view of a retroreflective element having a tilt θv that is a positive tilt in the group of hexagonal cube corner retroreflective elements according to the invention shown in FIG. 10. A symbol F on a reflective lateral surface indicates that the hexagonal cube corner retroreflective element is a tilted element whose optical axis is tilted toward the edge line HF. A solid line extending from the apex indicates the direction of the optical axis. The optical axis is tilted downward with respect to the tilt direction, which is indicated by a broken line, of a normal reflective element (line segment perpendicular to the common plane Sc). Since the hexagonal cube corner retroreflective element has a symmetrical shape, the optical axis thereof is within the plane (plane Sv) that is perpendicular to a reflective lateral surface (surface c) and includes the common edge line (HF) of the other reflective lateral surfaces (surface a and surface b) and the perpendicular line from the apex (H) to the common plane (plane Sc).

As shown in FIGS. 10 to 13, the retroreflective article, which is formed by the group of retroreflective elements whose optical axes are tilted by the tilts θv in the positive and negative directions, according to this embodiment includes two types of hexagonal cube corner retroreflective elements that are different from each other and that have optical axes tilted within the plane (plane Sv) that is perpendicular to a reflective lateral surface (surface c) and includes the common edge line (HF) of the other reflective lateral surfaces (surface a and surface b) and the perpendicular line from the apex (H) to the common plane (plane Sc). It is therefore possible to improve optical performance both in the directions toward the surface c and toward the edge line HF.

As a result, in the hexagonal cube corner retroreflective element according to this embodiment, it is possible to achieve a uniform optical characteristic or rotation angle characteristic both in the directions toward the surface a and the surface b or both in the directions toward the surface c and the edge line HF.

Second Embodiment

Figure 14:
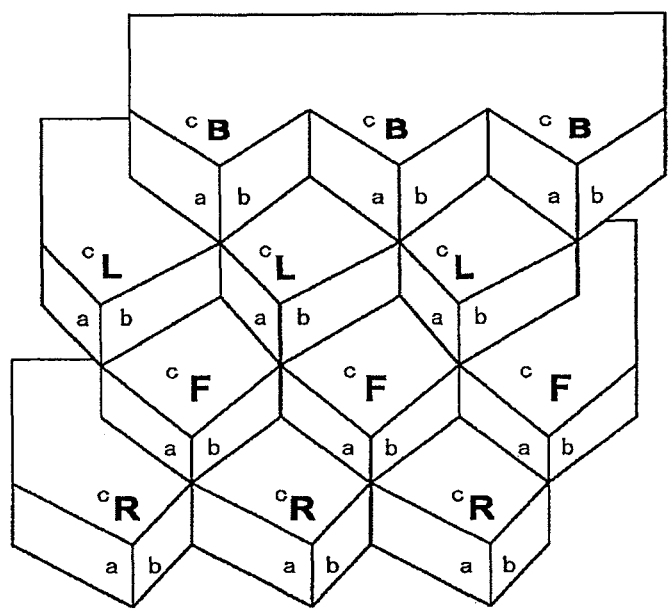
FIG. 14 is a front view of a retroreflective article according to a second embodiment of the invention.

FIG. 14 is a view showing a group of hexagonal cube corner retroreflective elements in a retroreflective article according to a second embodiment of the invention. As shown in FIG. 14, the group of hexagonal cube corner retroreflective elements according to this embodiment includes a combination of hexagonal cube corner retroreflective elements whose optical axes are tilted leftward and rightward (optical axes are tilted within the plane Sh) as shown in FIG. 5 and hexagonal cube corner retroreflective elements whose optical axes are tilted in the positive and negative directions (optical axes are tilted within the plane Sv) as shown in FIG. 10.

In FIG. 14, a retroreflective element indicated by a symbol B on a reflective lateral surface is an element whose optical axis is tilted toward the surface c within the plane Sv, which is referred to as an element having θv that is a negative tilt, and a retroreflective element indicated by a symbol F is an element whose optical axis is tilted toward the edge line HF within the plane Sv, which is referred to as an element having θv that is a positive tilt. In addition, a retroreflective element indicated by a symbol L is an element whose optical axis is tilted toward the surface a within the plane Sh, which is referred to as an element having θh that is a negative tilt, and a retroreflective element indicated by a symbol R is an element whose optical axis is tilted toward the surface b within the plane Sh, which is referred to as an element having θh that is a positive tilt.

With such a structure, elements having optical axes tilted in four directions of upward, downward, leftward and rightward directions are closely packed to form the group of hexagonal cube corner retroreflective elements shown in FIG. 14. Therefore, it is possible to improve the entrance angle characteristic, the observation angle characteristic and the rotation angle characteristic in all-round directions.

Figure 15:
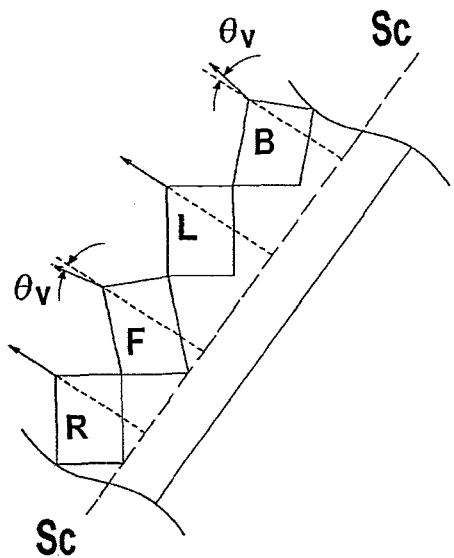
FIG. 15 is a side view of the retroreflective article according to the second embodiment.

FIG. 15 is a side view of the group of retroreflective elements formed to have optical axes tilted in four directions of upward, downward, leftward and rightward directions according to this embodiment shown in FIG. 14. As shown in FIG. 15, the apexes of the hexagonal cube corner retroreflective elements according to this embodiment are at different depths, and a common plane (plane Sc) is a plane connecting apexes of the hexagonal cube corner retroreflective elements formed at the deepest positions.

In FIG. 15, the uppermost element is tilted upward (toward the surface c) with respect to the tilt direction of the optical axis of a normal element shown by a broken line (line segment perpendicular to the common plane Sc), and the third element from the top is tilted downward (toward the edge line HF) with respect to the tilt direction of the optical axis of a normal element shown by a broken line. The second element from the top does not have any tilt component with respect to the tilt direction of the optical axis of a normal element in the upward and downward directions but is tilted leftward within the plane Sh. Furthermore, the lowermost element does not have any tilt component with respect to the tilt direction of the optical axis of a normal element in the upward and downward directions but is tilted rightward within the plane Sh. As described above, the retroreflective article according to this embodiment includes at least two or more types of hexagonal cube corner retroreflective elements that are different from each other and that have optical axes tilted within a plane (plane Sv) that is perpendicular to a reflective lateral surface (surface c) and includes the common edge line (HF) of the other reflective lateral surfaces (surface a and surface b) and a perpendicular line from the apex (H) to the common plane (plane Sc).

Third Embodiment

Figure 16:
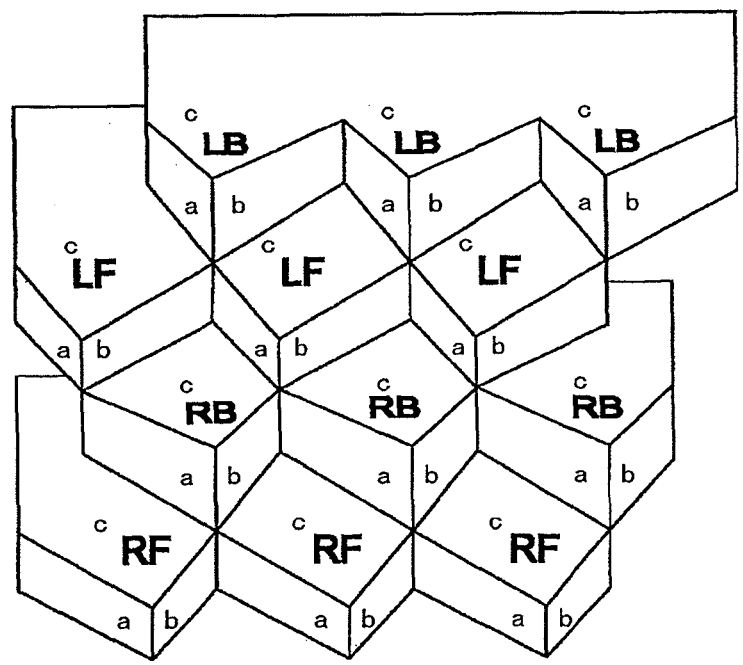
FIG. 16 is a front view of a retroreflective article according to a third embodiment of the invention.

FIG. 16 is a view showing a group of hexagonal cube corner retroreflective elements in a retroreflective article according to a third embodiment of the invention. As shown in FIG. 16, in the group of retroreflective elements according to this embodiment, the optical axis of each element is tilted upward or downward and also leftward or rightward.

Figure 17:
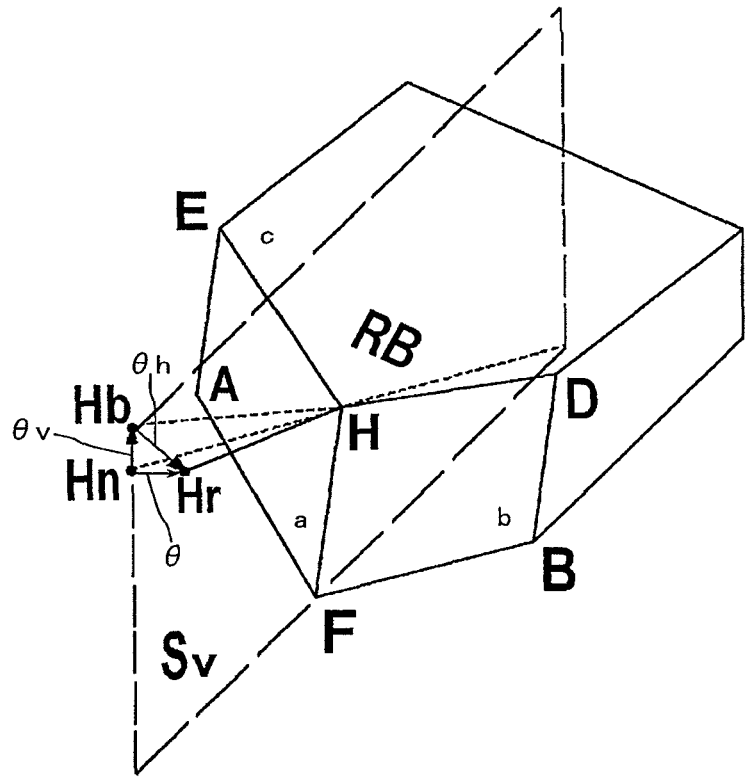
FIG. 17 is a perspective view showing a cube corner retroreflective element in the retroreflective article according to the third embodiment.

FIG. 17 is a view of an element indicated by a symbol RB, for example, on a reflective lateral surface thereof in FIG. 16. In FIG. 17, a perpendicular line from the apex H to the common plane (plane Sc: not shown) and a line (H-Hn) extended therefrom are indicated by a dotted line. A plane Sv is a plane including an edge line HF and the perpendicular line from H to the plane Sc. In addition, the optical axis (H-Hr) is indicated by a solid line. If an intersection of a perpendicular line from a certain point Hr on the optical axis to the plane Sv with the plane Sv is referred to as a point Hb, an arrow from the point Hn to the point Hb represents an upward or downward tilt ($\theta v$). Furthermore, an arrow from the point Hb to the point Hr represents a leftward or rightward tilt ($\theta h$). The tilt ($\theta$) of the optical axis is an angle obtained by combining the tilt component ($\theta h$) within a plane Sh (a plane including H, Hb and Hr) and the tilt component ($\theta v$) within the plane Sv. As shown in FIG. 17, the element indicated by the symbol RB is formed so that the optical axis thereof has $\theta h$ that is a positive tilt toward the surface b within the plane Sh and $\theta v$ that is a negative tilt toward the surface c within the plane Sv. Similarly, an element indicated by a symbol LB in FIG. 16 is formed so that the optical axis thereof has $\theta h$ that is a negative tilt toward the surface a within the plane Sh and $\theta v$ that is a negative tilt toward the surface c within the plane Sv. In addition, an element indicated by a symbol RF is formed so that the optical axis thereof has $\theta h$ that is a positive tilt toward the surface b within the plane Sh and $\theta v$ that is a positive tilt toward the edge line HF within the plane Sv. An element indicated by a symbol LF is formed so that the optical axis thereof has $\theta h$ that is a negative tilt toward the surface a within the plane Sh and $\theta v$ that is a positive tilt toward the edge line HF within the plane Sv. Therefore, in the group of the retroreflective elements in FIG. 16, the optical axes are tilted in four directions. As described above, the retroreflective article according to this embodiment includes two or more types of hexagonal cube corner retroreflective elements that are different from each other and that have optical axes tilted within a plane (plane Sv) that is perpendicular to a reflective lateral surface (surface c) and includes the common edge line (HF) of the other reflective lateral surfaces (surface a and surface b) and the perpendicular line from the apex (H) to the common plane (plane Sc).

Fourth Embodiment

Figure 18:
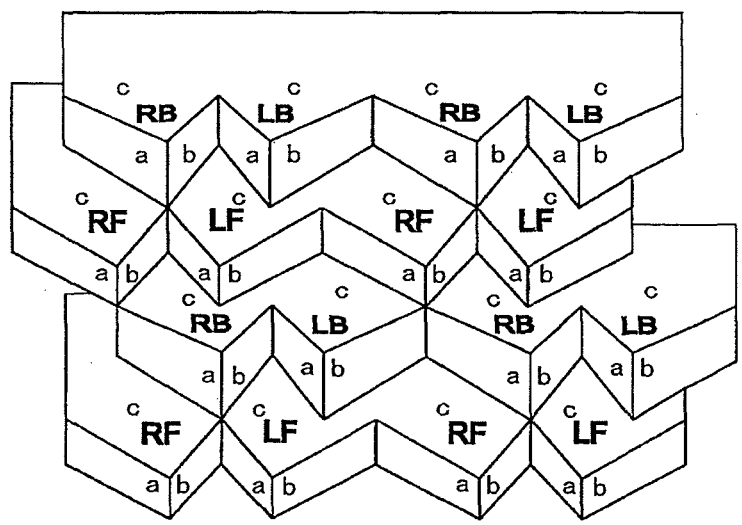
FIG. 18 is a front view of a retroreflective article according to a fourth embodiment of the invention.

FIG. 18 is a view showing a group of cube corner retroreflective elements in a retroreflective article according to a fourth embodiment of the invention. As shown in FIG. 18, in the retroreflective article according to this embodiment, the upward or downward tilt direction of optical axes of the cube corner retroreflective elements in adjacent rows are different from each other, similarly to the group of hexagonal cube corner retroreflective elements of the third embodiment shown in FIG. 16. However, while the optical axes of the elements in one row are tilted in the same direction of the leftward or rightward direction in the group of the hexagonal cube corner retroreflective optical elements in the third embodiment shown in FIG. 16, the optical axes of the elements in one row are tilted alternately leftward or rightward in the group of cube corner retroreflective elements shown in FIG. 18.

The group of cube corner retroreflective elements according to this embodiment shown in FIG. 18 is preferable in that more uniform retroreflective efficiency, entrance angle characteristic, observation angle characteristic and rotation angle characteristic can be obtained as compared to the group of hexagonal cube corner retroreflective elements according to the invention shown in FIG. 16.

Fifth Embodiment

Figure 19:
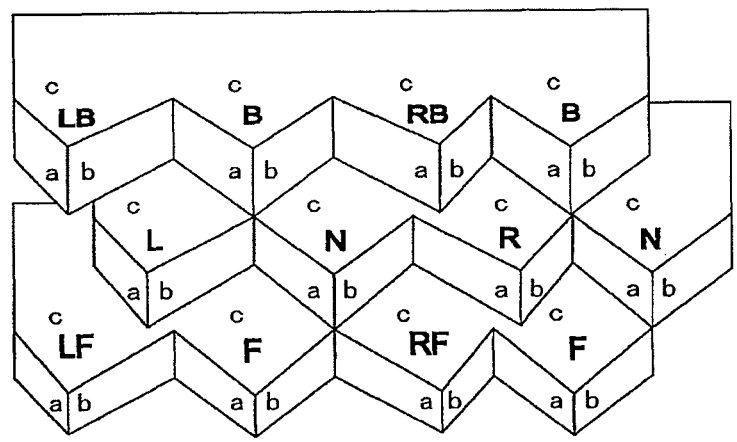
FIG. 19 is a front view of a retroreflective article according to a fifth embodiment of the invention.

FIG. 19 is a view showing a group of cube corner retroreflective elements in a retroreflective article according to a fifth embodiment of the invention. In the group of retroreflective elements according to this embodiment shown in FIG. 19, the upward or downward tilt direction of optical axes of the cube corner retroreflective elements in adjacent rows are different from each other, similarly to the group of cube corner retroreflective elements of the third embodiment shown in FIG. 16. However, in the group of retroreflective elements according to this embodiment shown in FIG. 19, elements in one row include elements having optical axes that are tilted leftward or rightward and elements having optical axes that are not tilted leftward or rightward. Therefore, the optical axes of the group of retroreflective elements in FIG. 19 are tilted in nine directions, which allows the retroreflective elements to have a particularly excellent rotation angle characteristic.

Figure 20:
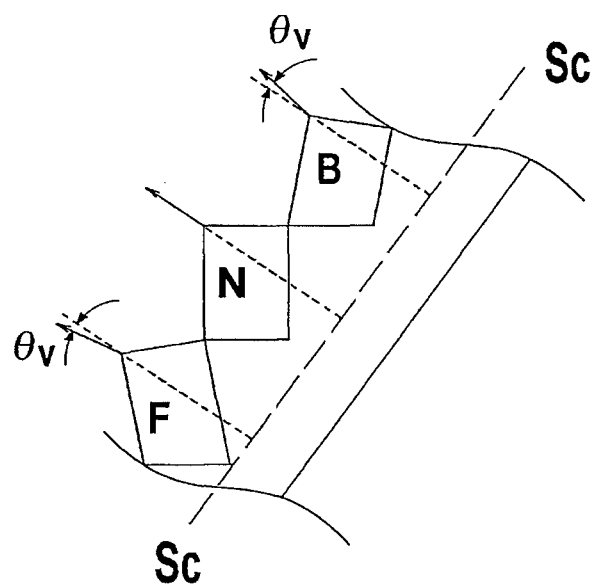
FIG. 20 is a side view of the retroreflective article according to the fifth embodiment.

FIG. 20 is a side view of the group of retroreflective elements formed to have optical axes tilted in nine directions including upward, downward, leftward and rightward directions according to this embodiment shown in FIG. 19. As shown in FIG. 20, apexes of the cube corner retroreflective elements according to this embodiment are at different depths, and a common plane (plane Sc) is a plane connecting apexes of the cube corner retroreflective elements formed at the deepest positions.

In FIG. 20, the direction, shown by a solid line, of the optical axis of the uppermost element is upward (toward the surface c) with respect to the tilt direction of the optical axis of a normal element shown by a broken line (line segment perpendicular to the common plane Sc). That is, θv thereof is a negative tilt. Some elements indicated by symbols LB and RB in FIG. 19 are tilted leftward or rightward within a plane Sh. That is, θh thereof is a positive tilt or a negative tilt. In the side view, the middle elements do not have a tilt component in the upward and downward directions with respect to the tilt direction of the optical axis of a normal element, but have θh tilted leftward or rightward within the plane Sh as shown in FIG. 19. In addition, as shown in FIG. 20, the optical axis, shown by a solid line, of the lowermost element is tilted downward (toward the edge line HF) with respect to the tilt direction of the optical axis of a normal element shown by a broken line. That is, θv thereof is a positive tilt. Some elements indicated by symbols LF and RF in FIG. 19 are tilted leftward or rightward within the plane Sh. That is, θh thereof is a positive tilt or a negative tilt.

INDUSTRIAL APPLICABILITY

Examples of specific possible use of a retroreflective article according to the invention include a traffic sign, a construction sign, retroreflective clothing, a reflector for an optical sensor, a commercial sign and a vehicle registration plate. Since the retroreflective article has an excellent rotation angle characteristic, the sheeting thereof can be cut in any direction and used for a sign.

DESCRIPTION OF REFERENCE NUMERALS

HF . . . edge line
Sc . . . common plane

The invention claimed is:

1. A retroreflective article, comprising:
a number of cube corner retroreflective elements formed in a closely packed manner on a common plane (plane Sc), each of the cube corner retroreflective elements having three reflective lateral surfaces (surface a, surface b and surface c) that have three edge lines (HD, HE and HF) and one apex (H) in common and an optical axis that passes through the apex (H) and is at equal distance from the three reflective lateral surfaces (surface a, surface b and surface c); and
at least two types of cube corner retroreflective elements having optical axes tilted with respect to each other within a plane (plane Sv) that is perpendicular to a reflective lateral surface (surface c) of each cube corner reflective element and includes a common edge line (HF) of the other reflective lateral surfaces (surface a and surface b) and a perpendicular line from the apex (H) to the common plane (plane Sc).

2. The retroreflective article according to claim 1, wherein the retroreflective article comprises at least pair of cube corner retroreflective elements having optical axes tilted toward opposite directions with respect to the perpendicular line from the apex (H) to the common plane (plane Sc), and within the plane (plane Sv) that is perpendicular to a reflective lateral surface (surface c) and includes the common edge line (HF) of the other reflective lateral surfaces (surface a and surface b) and the perpendicular line.

3. The retroreflective article according to claim 1 or 2, wherein an angle (θv) of the optical axes with respect to the perpendicular line from the apexes (H) to the common plane (plane Sc) is in a range from +0.5 to +15° or −0.5 to −15°.

4. The retroreflective article according to claim 3, wherein the angle (θv) of the optical axes with respect to the perpendicular line from the apexes (H) to the common plane (plane Sc) is in a range from +2 to +7° or −2 to −7°.

5. The retroreflective article according to claim 1, wherein an optical axis of a cube corner retroreflective element is tilted with respect to a perpendicular line from the apex (H) to the common plane (plane Sc) within the plane (plane Sv) that is perpendicular to a reflective lateral surface (surface c) and includes a common edge line (HF) of the other reflective lateral surfaces (surface a and surface b) and the perpendicular line from the apex (H) to the common plane (plane Sc).

6. The retroreflective article according to claim 2, wherein an optical axis of a cube corner retroreflective element is tilted with respect to a perpendicular line from the apex (H) to the common plane (plane Sc) within the plane (plane Sv) that is perpendicular to a reflective lateral surface (surface c) and includes a common edge line (HF) of the other reflective lateral surfaces (surface a and surface b) and the perpendicular line from the apex (H) to the common plane (plane Sc).

7. The retroreflective article according to claim 3, wherein an optical axis of a cube corner retroreflective element is tilted with respect to a perpendicular line from the apex (H) to the common plane (plane Sc) within the plane (plane Sv) that is perpendicular to a reflective lateral surface (surface c) and includes a common edge line (HF) of the other reflective lateral surfaces (surface a and surface b) and the perpendicular line from the apex (H) to the common plane (plane Sc).

8. The retroreflective article according to claim 4, wherein an optical axis of a cube corner retroreflective element is tilted with respect to a perpendicular line from the apex (H) to the common plane (plane Sc) within the plane (plane Sv) that is perpendicular to a reflective lateral surface (surface c) and includes a common edge line (HF) of the other reflective lateral surfaces (surface a and surface b) and the perpendicular line from the apex (H) to the common plane (plane Sc).

9. The retroreflective article according to claim 5, which comprises at least one pair of cube corner retroreflective elements having optical axes tilted towards opposite directions with respect to a perpendicular line from the apex (H) to the common plane (plane Sc), within the plane (plane Sv) that is perpendicular to the reflective lateral surface (surface c), and includes the common edge line (HF) of the other reflective lateral surfaces (surface a and surface b) and the perpendicular line from the apex (H) to the common plane (plane Sc).

10. The retroreflective article according to claim 6, which comprises at least one pair of cube corner retroreflective elements having optical axes tilted towards opposite directions with respect to a perpendicular line from the apex (H) to the common plane (plane Sc), within the plane (plane Sv) that is perpendicular to the reflective lateral surface (surface c), and includes the common edge line (HF) of the other reflective lateral surfaces (surface a and surface b) and the perpendicular line from the apex (H) to the common plane (plane Sc).

11. The retroreflective article according to claim 7, which comprises at least one pair of cube corner retroreflective elements having optical axes tilted towards opposite directions with respect to a perpendicular line from the apex (H) to the common plane (plane Sc), within the plane (plane Sv) that is perpendicular to the reflective lateral surface (surface c), and includes the common edge line (HF) of the other reflective lateral surfaces (surface a and surface b) and the perpendicular line from the apex (H) to the common plane (plane Sc).

12. The retroreflective article according to claim 8, which comprises at least one pair of cube corner retroreflective elements having optical axes tilted towards opposite directions with respect to a perpendicular line from the apex (H) to the common plane (plane Sc), within the plane (plane Sv) that is perpendicular to the reflective lateral surface (surface c), and includes the common edge line (HF) of the other reflective lateral surfaces (surface a and surface b) and the perpendicular line from the apex (H) to the common plane (plane Sc).

13. The retroreflective article according to claim 9, wherein at least two cube corner retroreflective elements have optical axes different from each other also provide that planes Sv exhibit horizontal directions that differ from each other.

14. The retroreflective article according to claim 10, wherein at least two cube corner retroreflective elements have optical axes different from each other also provide that planes Sv exhibit horizontal directions that differ from each other.

15. The retroreflective article according to claim 11, wherein at least two cube corner retroreflective elements have optical axes different from each other also provide that planes Sv exhibit horizontal directions that differ from each other.

16. The retroreflective article according to claim 12, wherein at least two cube corner retroreflective elements have optical axes different from each other also provide that planes Sv exhibit horizontal directions that differ from each other.

17. The retroreflective article according to claim 9, wherein at least two cube corner retroreflective elements having optical axes different from each other also provide that planes Sv exhibit horizontal directions that are the same.

18. The retroreflective article according to claim 10, wherein at least two cube corner retroreflective elements having optical axes different from each other also provide that planes Sv exhibit horizontal directions that are the same.

19. The retroreflective article according to claim 11, wherein at least two cube corner retroreflective elements having optical axes different from each other also provide that planes Sv exhibit horizontal directions that are the same.

20. The retroreflective article according to claim 12, wherein at least two cube corner retroreflective elements having optical axes different from each other also provide that planes Sv exhibit horizontal directions that are the same.

* * * * *

UNITED STATES PATENT AND TRADEMARK OFFICE
CERTIFICATE OF CORRECTION

Page 1 of 2

PATENT NO. : 8,511,839 B2
APPLICATION NO. : 13/132151
DATED : August 20, 2013
INVENTOR(S) : Ikuo Mimura et al.

It is certified that error appears in the above-identified patent and that said Letters Patent is hereby corrected as shown below:

In the Specification

COLUMN 1:

Line 50, "prisms are" should read -- prism is --.

COLUMN 4:

Line 30, "by," should read -- by --.

COLUMN 7:

Line 43, "Oh" should read -- $\theta h$ --, and
Line 45, "Oh" should read -- $\theta h$ --.

COLUMN 10:

Line 53, "Oh" should read -- $\theta h$ --.

COLUMN 12:

Line 21, "direction" should read -- directions --; and
Line 47, "direction" should read -- directions --.

In the Claims

COLUMN 13:

Line 56, "pair" should read -- one pair --.

Signed and Sealed this
Twelfth Day of November, 2013

Teresa Stanek Rea
*Deputy Director of the United States Patent and Trademark Office*

COLUMN 15:

Line 16, "have" should read -- having --; and
Line 20, "have" should read -- having --.

COLUMN 16:

Line 2, "have" should read -- having --.